United States Patent
Pradel

(10) Patent No.: US 6,454,248 B2
(45) Date of Patent: Sep. 24, 2002

(54) PNEUMATIC SPRING WITH OSCILLATION DAMPER ADJUSTED AS A FUNCTION OF THE SUPPORT PRESSURE

(75) Inventor: Robert Pradel, Heidenfeld (DE)

(73) Assignee: Mannesmann Sachs AG, Schweinfurt (DE)

( * ) Notice: Subject to any disclaimer, the term of this patent is extended or adjusted under 35 U.S.C. 154(b) by 5 days.

(21) Appl. No.: 09/804,215

(22) Filed: Mar. 12, 2001

(30) Foreign Application Priority Data

Mar. 23, 2000 (DE) .......................................... 100 14 467

(51) Int. Cl.⁷ .................................................. F16F 9/04
(52) U.S. Cl. .................................. 267/64.24; 267/64.11
(58) Field of Search ......................... 267/64.24, 64.11, 267/64.27, 122, 124

(56) References Cited

U.S. PATENT DOCUMENTS

| 3,399,882 | A | | 9/1968 | Hausmann |
|---|---|---|---|---|
| 3,589,655 | A | * | 6/1971 | Hackbeth et al. ............ 188/268 |
| 4,325,541 | A | * | 4/1982 | Korosladanyi et al. ..... 267/220 |
| 4,445,673 | A | * | 5/1984 | Clark ...................... 188/282.7 |
| 4,588,171 | A | * | 5/1986 | Stephens .................... 188/318 |
| 4,647,025 | A | * | 3/1987 | Gold ........................... 267/122 |
| 4,669,710 | A | * | 6/1987 | Horvat ......................... 137/38 |
| 4,673,171 | A | * | 6/1987 | Buma ...................... 188/266.3 |
| 4,697,797 | A | * | 10/1987 | Gold ............................. 267/27 |
| 4,722,548 | A | * | 2/1988 | Hamilton et al. ........... 188/284 |
| 4,742,996 | A | * | 5/1988 | Gold ............................. 267/35 |
| 4,844,428 | A | * | 7/1989 | Margolis et al. ............ 188/318 |
| 4,934,667 | A | * | 6/1990 | Pees et al. .............. 188/322.17 |
| 5,135,203 | A | * | 8/1992 | Wijnhoven et al. ...... 267/64.21 |
| 5,169,129 | A | * | 12/1992 | Hoffman ...................... 267/122 |
| 5,518,225 | A | * | 5/1996 | Gubitz ..................... 267/64.24 |
| 6,286,820 | B1 | * | 9/2001 | Raulf et al. .............. 267/64.21 |
| 6,343,781 | B1 | * | 2/2002 | Joseph ..................... 267/64.11 |

FOREIGN PATENT DOCUMENTS

| DE | 32 21 850 | 1/1983 |
|---|---|---|
| DE | 35 26 156 | 1/1987 |
| DE | 40 22 099 | 12/1991 |
| DE | 44 03 196 | 8/1994 |
| DE | 44 29 992 | 11/1996 |

OTHER PUBLICATIONS

N. Breuer, J. Kock: "Die pneumatische Niveauregelanlage des Audi A6", DE–Z: ATZ/MTZ, Sonderdruck H3, 1997.

* cited by examiner

Primary Examiner—Jack Lavinder
Assistant Examiner—Benjamin A Pezzlo
(74) Attorney, Agent, or Firm—Cohen, Pontani, Lieberman & Pavane

(57) ABSTRACT

Spring strut with a pneumatic spring and an oscillation damper which can be adjusted as a function of the support pressure. The pneumatic spring has a spring space bounded by a U-type bellows, which spring space is pneumatically connected to a damping device which can be adjusted as a function of a support pressure. A component which having a duct connects the spring space and the damping device is embodied without a hose and is integrated in the spring strut in such a way that it does not form any essential surface change in an unrolling piston associated with the U-type bellows and the unrolling piston forms at least a part of this duct.

20 Claims, 9 Drawing Sheets

PNEUMATIC SPRING WITH OSCILLATION DAMPER ADJUSTED AS A FUNCTION OF THE SUPPORT PRESSURE

BACKGROUND OF THE INVENTION

1. Field of the Invention

The invention relates to a spring strut, which has a pneumatic spring with a spring space bounded by a U-type bellows and an oscillation damper with a damping device which can be modified as a function of the support pressure, the bellows riding on an unrolling piston filled to a container of the oscillation damper. In order to modify the damping effect as a function of the support pressure, the spring space is pneumatically connected to the damping device.

2. Description of the Related Art

U.S. Pat. No. 3,399,882 and DE 44 03 196, to which U.S. Pat. No. 5,509,512 corresponds, disclose spring struts in which the U-type bellows is fastened on the container or the cylinder of the oscillation damper and the U-type bellows unrolls on these components. In these designs, the pressure in the spring space acts on a diaphragm, which modifies the valve device or a passage cross section by means of complicated transmission and adjustment elements. Such spring struts are exclusively designed for predetermined damping force variation; once determined, modification or adjustment to the damping force can no longer be undertaken without partial dismantling. A different damping force characteristic demands a modification to components which are not accessible after assembly, so that a subsequent adjustment is very problematic and expensive.

It is also known to arrange easily accessible and variable damping valves externally on the container of the oscillation damper. These valves are easily accessible after removal of the valve housing cap. Such embodiments have a hose conduit between the spring space and the valve device, which hose conduit must be connected both to the spring space by means of a screw connection and to the valve device by means of a further screw connection. These connections are not therefore only expensive to manufacture and assemble, but are also susceptible to external damage.

SUMMARY OF THE INVENTION

The object of the present invention is to create a spring strut with adjustment, as a function of the support pressure, of a damping device of the oscillation damper, which spring strut has a simple construction, can be assembled without problem, consists of components which can be manufactured at favorable cost and possesses a high level of operational reliability.

According to the invention, the spring space is pneumatically connected to the damping device by a duct configured without a hose. The duct is integrated into the spring strut and is formed at least in part by the unrolling piston.

The invention provides a simple construction, a connection between the spring space of the pneumatic spring and the damping device which is protected against damage and accessible from the outside, as well as easy and problem free assembly. The duct section integrated in the unrolling piston is formed, for example, by two adjacent support ribs and/or a connection hole, which open into a further duct section. A simple connection between the spring space and the damping device is obtained by providing the unrolling piston with an extension exhibiting the further duct section, which extension can be directly connected to the damping device of the oscillation damper. The extension is preferably embodied as a connecting part, which has a connection mouthpiece, which accommodates a seal and which, by means of the mouthpiece, engages in a connection hole of the unrolling piston. This creates a connection between the spring space and the damping device which is simple, is of favorable cost, can be assembled without problems and is operationally extremely reliable.

A snap connection, between the connection mouthpiece of the connecting part and the connection hole of the unrolling piston, may be provided by sprung tongues each of which has a protrusion at the end of the connection mouthpiece and by this means engages behind the connection hole. This creates a reliable connection by simply pressing the connection mouthpiece into the connection hole. Such a snap connection can be manufactured and assembled at favorable cost and is not released by the internal pressure present in the spring space.

A very compact design of the spring strut is created by arranging the connecting part in a corresponding recess of the unrolling piston and, at least in the region of the unrolling piston, by providing the connecting part with an external surface which is matched to the external contour of the unrolling piston, so that the connecting part is included in the rolling surface for the U-type bellows. By this means, a rolling surface which does not have any interfering edges is created for the U-type bellows.

For simple connection to the damping device, the connecting part is provided with a connection which interacts with a seal. This connection is, for example, embodied as a spigot which forms a plug-in connection with a corresponding hole in the housing cap. If the center line of the spigot and the center line of the hole extend parallel to the center line of the spring strut, it is then also possible to produce the plug-in connection with the damping device at the same time as the unrolling piston, which is provided with the connecting part, is pushed onto the container of the oscillation damper. According to a further embodiment, the spigot forming the connection and the hole in the housing cap have a common center line which extends at right angles to the center line of the spring strut, In this arrangement, the connecting part can be pushed on after the unrolling piston has been pushed onto the container of the oscillation damper, it being also possible to embody the trunnion pushed into the hole of the housing cap with elastic tongues for a snap-in connection.

The accurate positioning of the unrolling piston on the container of the oscillation damper takes place by means of one or more radially outwardly directed protrusions on the container, which interact with corresponding recesses in the unrolling piston. A very simple and cost-saving embodiment is obtained if, for accurate positioning, the housing of the damping device forms the protrusion and the unrolling piston is in contact with this housing by means of a correspondingly matched recess. The unrolling piston is pressed axially downward against the housing by the pressure in the spring space. In order to prevent any possibility of the unrolling piston moving axially on the housing, which can occur during transport, during installation or during operation due to objects lying on the track, axial fixing of the unrolling piston on the container is provided simply and at favorable cost if the housing of the damping device is part of this axial fixing arrangement.

Very simple axial fixing of the unrolling piston on the container, which is produced automatically during the assembly of the unrolling piston on the container of the oscillation damper, is provided by a snap-in connection between these two components. This snap-in connection is formed by at least one snap arm which engages in a corresponding depression or recess in the housing of the damping device, the connection feature of the connecting part being a spigot, which extends parallel to the center line of the spring strut and which engages in a corresponding hole in the housing cap.

Further embodiments, which have simple and easily manufactured fixing arrangements for the unrolling piston on the container are created by the unrolling piston having an axial extension, which is provided with a recess matched to the housing. The fixing takes place by means of a clamp, which is seated on the extension and is arranged below the housing. In a further advantageous embodiment, the unrolling piston has two connecting arms encompassing a cylindrical region of the housing, which connecting arms are connected together by means of a locking screw or a locking pin in contact with the lower edge of the housing.

A design which is simple in construction and can be assembled without problems is obtained if the connecting part is configured in one piece with the housing cap and is permanently connected to the housing of the damping device. In this way, axial fixing of the unrolling piston on the container is also additionally created by means of tea connecting part so that, furthermore, a nicely shaped embodiment of the spring strut is obtained.

In addition, an advantageous design is created by means of a connecting part if this connecting part is first connected to the housing cap of the damping device and the connection with the unrolling piston is produced when it is pushed onto the container. A particularly favorable embodiment is obtained if a push connection is arranged between the connecting part and the acceptance feature formed by the unrolling piston. Connecting parts configured in this way can also be matched without problems to the external contour of the unrolling piston.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIES

Figure 1:
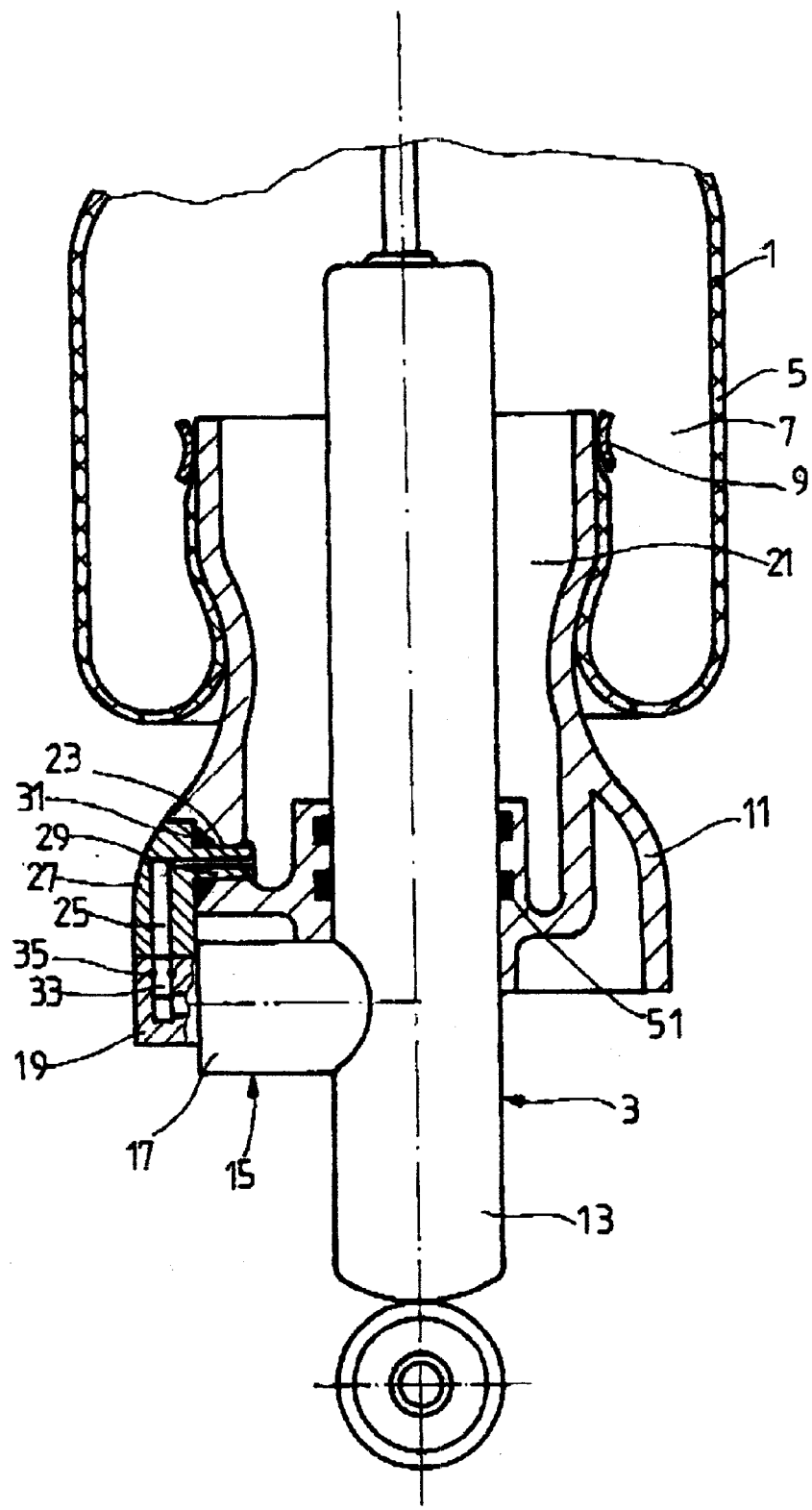
FIG. 1 shows a sketch, in longitudinal section, of a spring strut according to the invention.

The spring strut shown in FIG. 1 includes a pneumatic spring 1 and an oscillation damper 3, a U-type bellows 5 bounding, to the outside, a spring space 7 which is under pressure. The U-type bellows 5 has a sealed connection on the upper end of the unrolling piston 11 by means of a U-type bellows clamp 9. The unrolling piston 11 is pushed onto a container 13 of the oscillation damper 3, is supported on the outer surface of the container 13 by support ribs 21, and is sealed toward the outside by sealing rings 51. A damping device 15 of the oscillation damper 3, which damping device 15 can be modified as a function of pressure, is arranged in a housing 17 which is permanently connected to the container 13. The center line of the housing 17 extends approximately at right angles to the center line of the spring strut and acts as a stop for the unrolling piston 11.

The pressure in the spring space 7 corresponds to the support forces which are present between the vehicle superstructure and the vehicle wheel and are accepted by the spring strut. In order to achieve a modification in the damping effect of the oscillation damper 3, which depends on the support pressure, a pneumatic connection between the spring space 7 and a damping device 15 is necessary. For this purpose, a connecting part 27 is provided with a duct 25 having a connection mouthpiece 29 which engages a corresponding connection hole of the unrolling piston 11 and a connection 33 which is inserted into a housing cap 19 of the damping device 15. A seal 31 is used for sealing the connecting part 27 relative to the unrolling piston 11 and a seal 35 is used for sealing on the housing cap 19.

Figure 2:
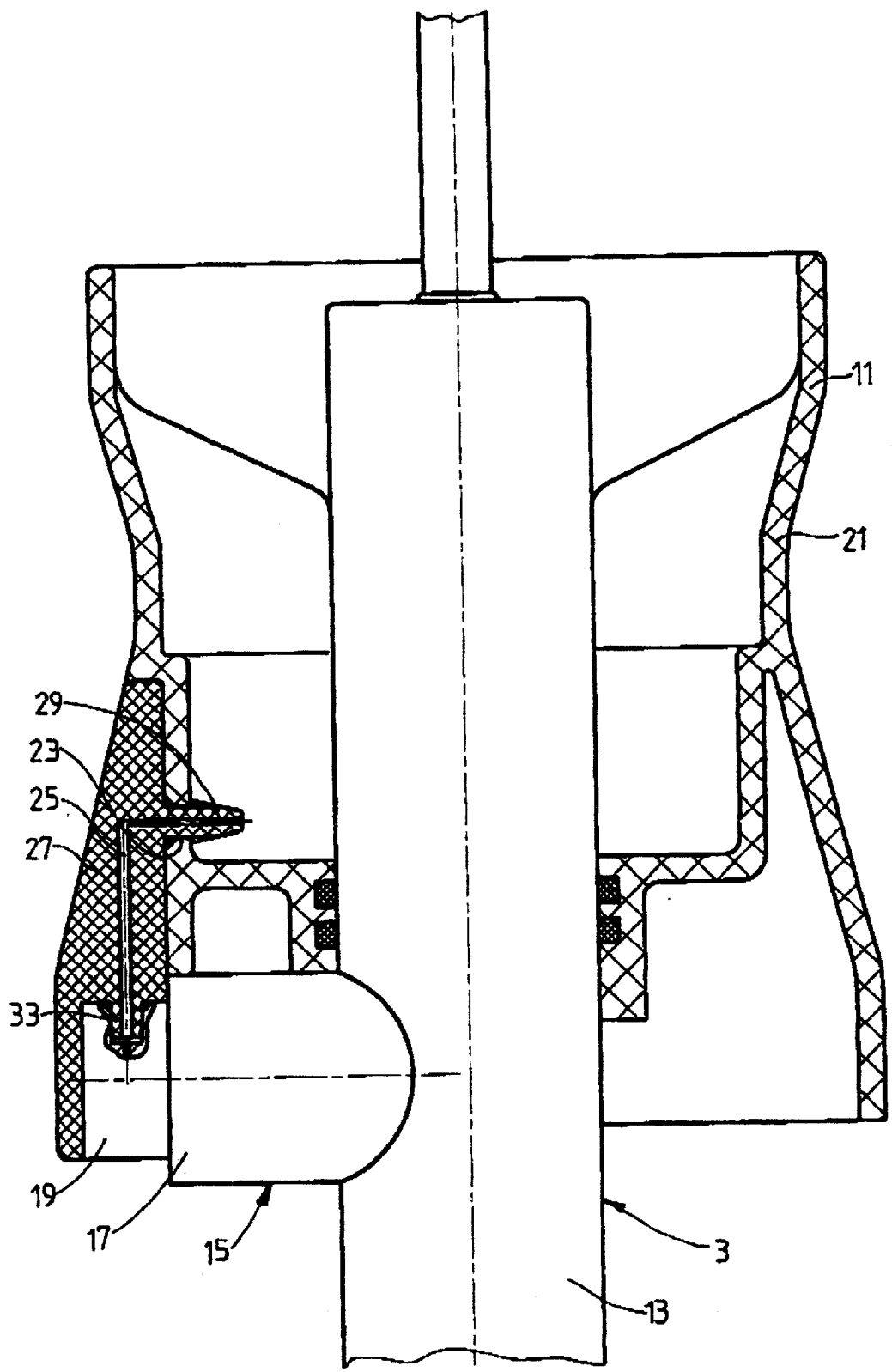
FIG. 2 shows an excerpt, in longitudinal section, of a spring strut design in the region of the unrolling piston.
Figure 3:
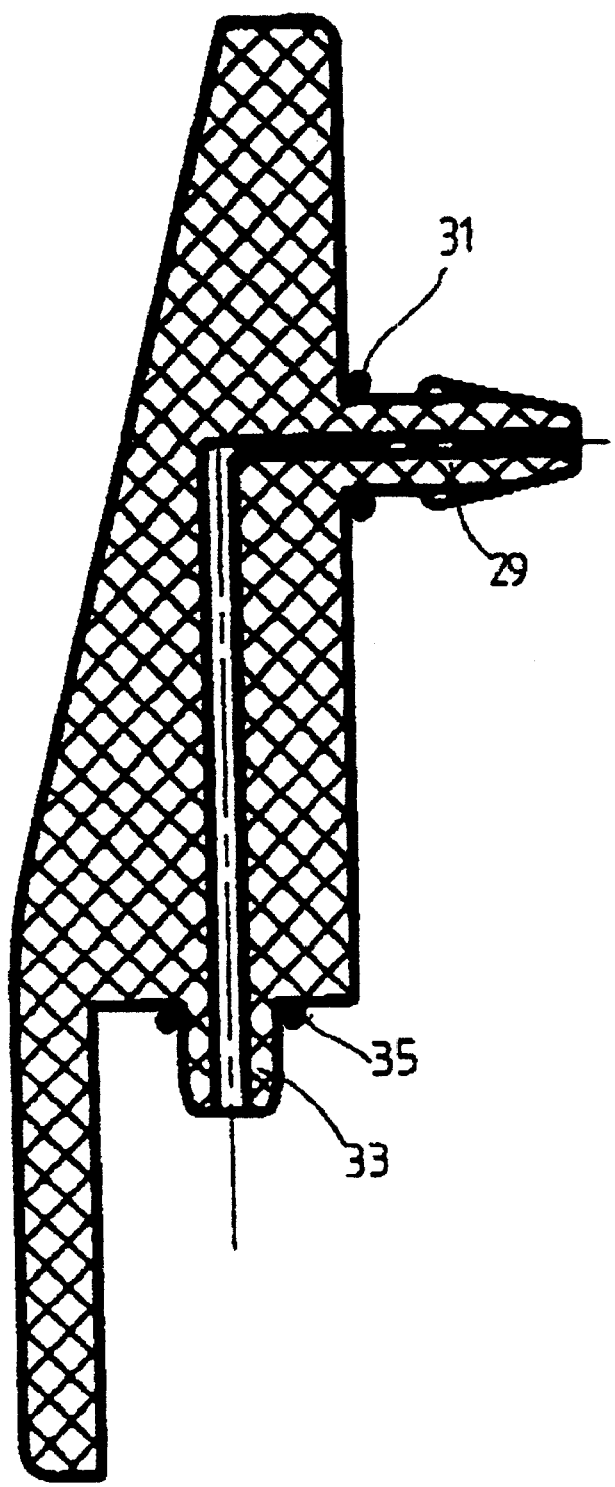
FIG. 3 shows a connecting part between the s space and the damping device, as the latter is constructed in FIG. 2.

FIGS. 2 and 3 show details of the pneumatic connection, sketched above, between the spring space 7 and the damping device 15. The connecting part 27 is arranged in a recess of the unrolling piston 11. The connecting part 27 is pressed into the connection hole 23 of the unrolling piston 11 by means of the connection mouthpiece 29, onto which is placed a seal 31, the two components being preferably manufactured from a suitable plastic. A snap connection between the connection mouthpiece 29 and the connection hole 23 is provided by spring tongues arranged at the end of the connection mouthpiece 29. The external contour of the connecting part 27, which is provided with the duct 25, corresponds to the external contour of the unrolling piston 11, so that there is no unevenness for the U-type bellows on the rolling surface. The unrolling piston 11 provided with the connecting part 27 is now pushed onto the container 13 of the oscillation damper 3 and is sealed toward the outside by the seals 51. For correct positional arrangement of the unrolling piston 11 on the container 13, the unrolling piston 11 has an recess matched to the outer surface of the housing 17. While the oscillation damper 3 is being pushed onto the container 13, the connection 33, which is configured as a spigot and carries a seal 35. The connection 33 is pushed into a corresponding hole in the housing cap 19 and sealed, so that the duct 25 of the spring space 7 connects to the damping device and pressure changes occurring in the spring space 7 act on the damping device 15.

Figure 4:
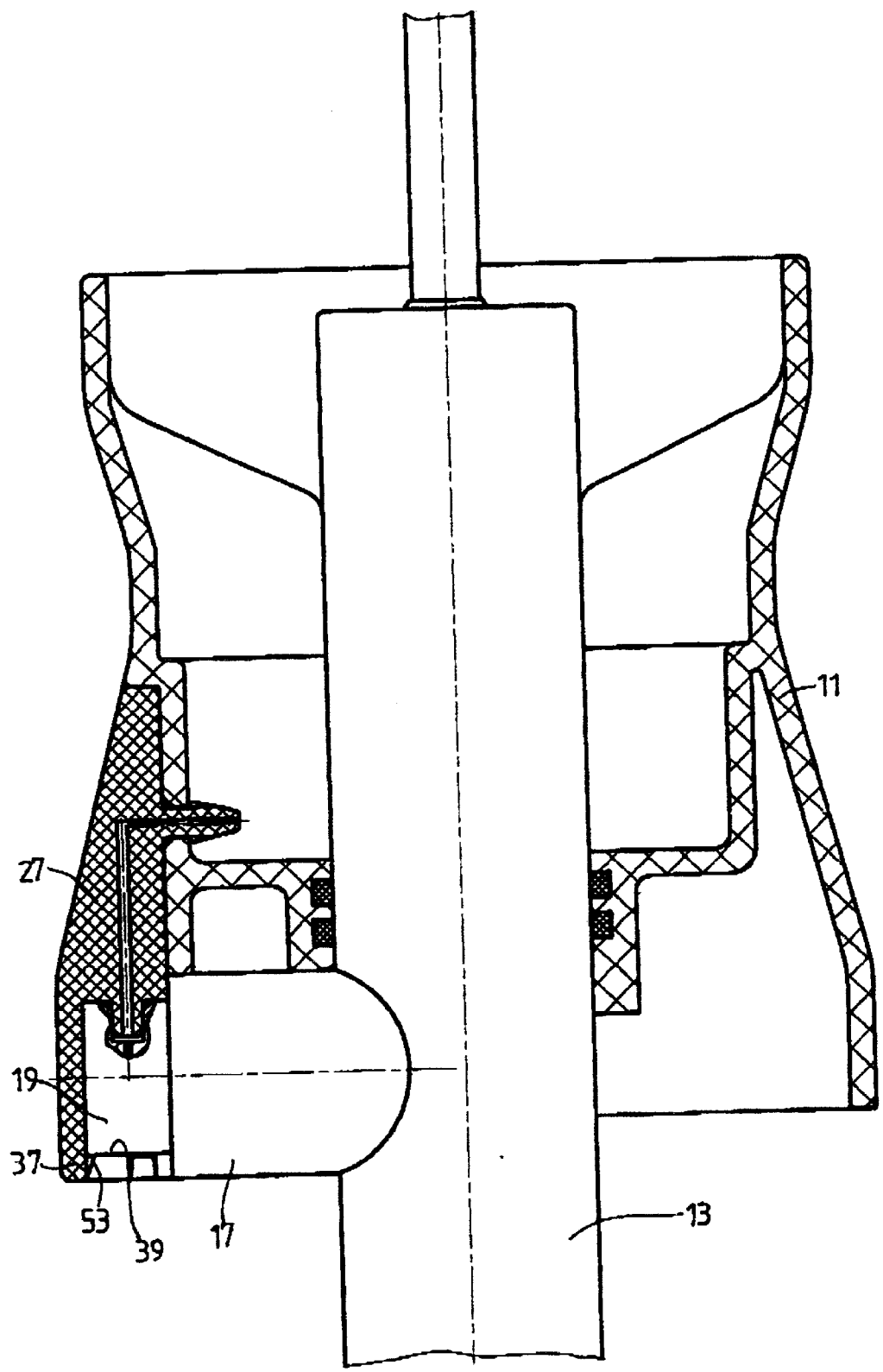
FIG. 4 shows a further embodiment of a connection between the spring space and the damping device.

The embodiment of FIG. 4 differs from that previously described essentially in that the extension of the connecting part 27 overlapping the housing cap 19 is configured as a fastening arm 37. At its lower end, this fastening arm 37 carries at least one snap hook 53 with a joint surface extending downward and a retention surface extending at right angles to the spring strut center line. After the unrolling piston 11 has been completely pushed onto the container 13, this retention surface engages in the lower edge 39 of the housing cap 19. This creates a degree of security against unintentionally pushing the unrolling piston 11 too far up on the container 13, for example during assembly.

Figure 5:
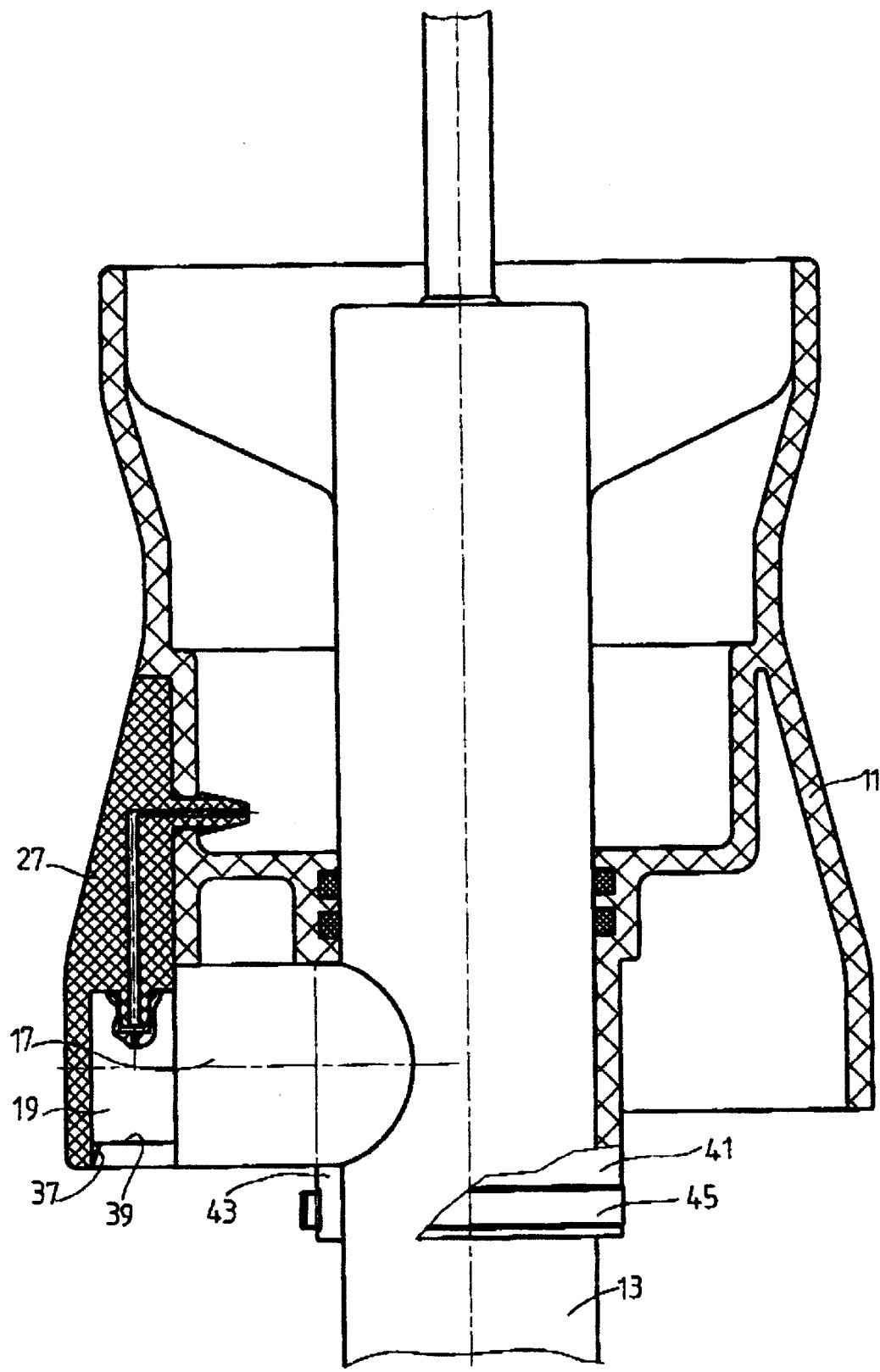
FIG. 5 shows a further spring strut design, in which the unrolling piston is axially fixed on the container of the oscillation damper by means of a clamp.

An additional security measure is desirable, particularly in the case of cross-country vehicles, to prevent the unrolling piston 11 being pushed up on the container 13 by the action of objects lying on the track such as branches or the like. FIG. 5 shows such an additional security measure, in which the unrolling piston 11 is provided with a downwardly directed axial extension 41 surrounding the container 13, this axial extension 41 having a recess 43 matched to the housing 17. The extension 41 is loaded against the container 13 by means of a clamp 45 arranged on the lower end of the extension in a corresponding depression, it being possible for the clamp 45 to be arranged in such a way that it is in contact with the lower edge of the housing 17.

Figure 6:
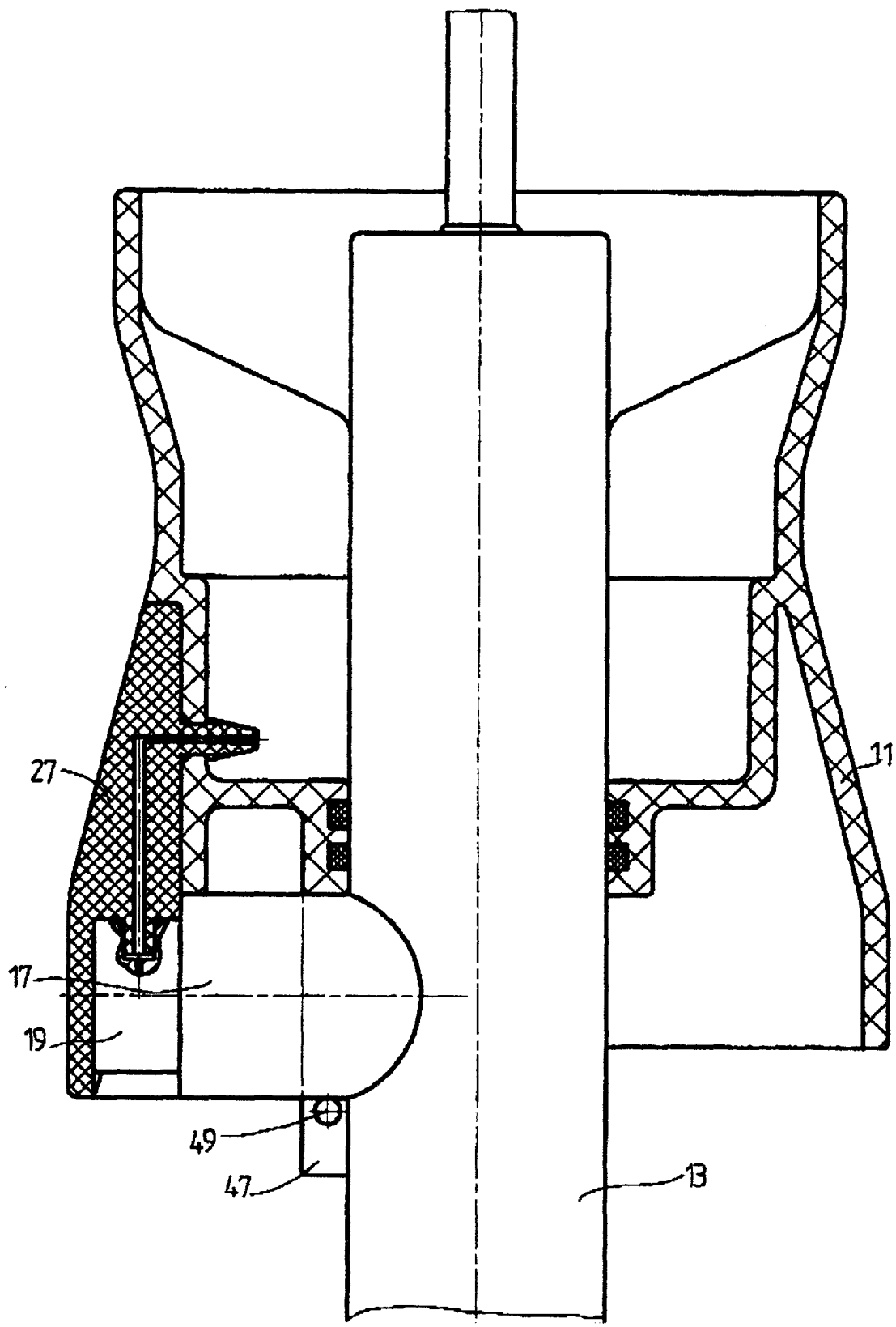
FIG. 6 shows a further embodiment of the fixing of the unrolling piston on the container of the oscillation damper.

A further security measure to prevent the unrolling piston 11 from being pushed up on the container 13 is shown in FIG. 6. For this purpose, the unrolling piston 11 is provided with two axially extending connecting arms 47 on both sides of the housing 17. A locking screw or a locking pin 49 is effective between the connecting arms 47 and is preferably in contact with the lower edge of the housing 17. This prevents the unrolling piston 11 being forcefully pushed up, on the container 13, and therefore prevents an associated loosening of the connecting part 27 from the housing cap 19, which would also lead to a failure of the pneumatic spring.

Figure 7:
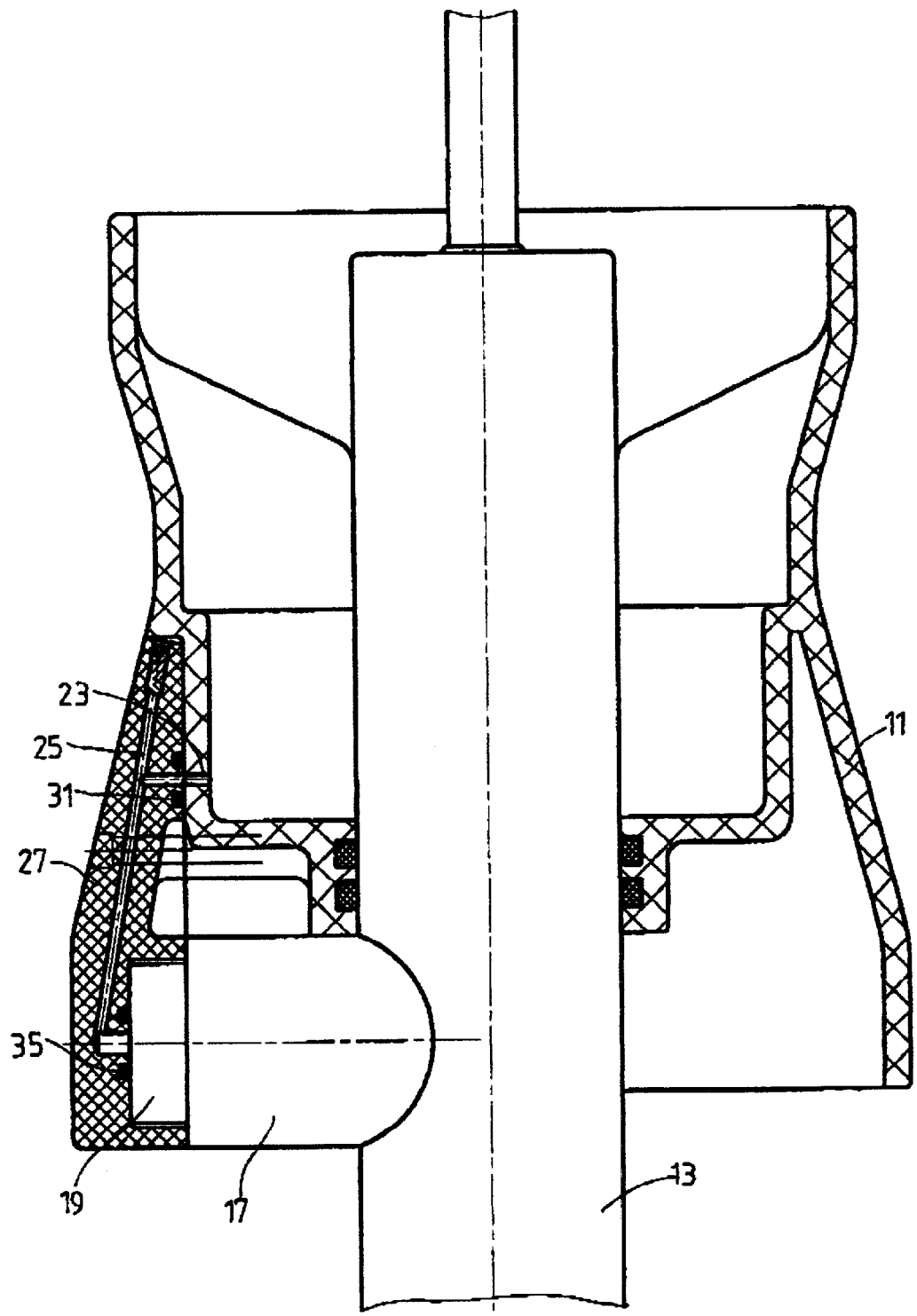
FIG. 7 shows, in longitudinal section, an embodiment form in which the connecting part comprises the housing cap of the damping device.

In a further advantageous embodiment shown in FIG. 7, the connecting part 27 is provided with an extension, which surrounds the essentially cylindrical outer surface of the housing cap 19 and forms, for example, a snap-in connection with the outer surface. The seal 35 is accommodated in an annular groove of the connecting part 27 and is pressed against the end surface of the housing cap 19. When the unrolling piston 11 is subsequently pushed onto the container 13, the connecting part 27 with the duct 25 is pushed like a slide into a guide (not shown) of the unrolling piston 11. It is possible to arrange joining aids between the, guide and the connecting part 27, which ensure that—toward the end of the insertion movement—the seal 31, which is placed in an annular groove, is pressed against the sealing surface arranged in the region of the connection hole 23. The end of the insertion movement is reached when the unrolling piston 11 is in contact with a contact surface on the housing 17. It is advantageous for the connecting part 27 to be subsequently connected to the unrolling piston 11 by means of fastening screws; this creates a security measure against the unrolling piston 11 being pushed up.

Figure 8:
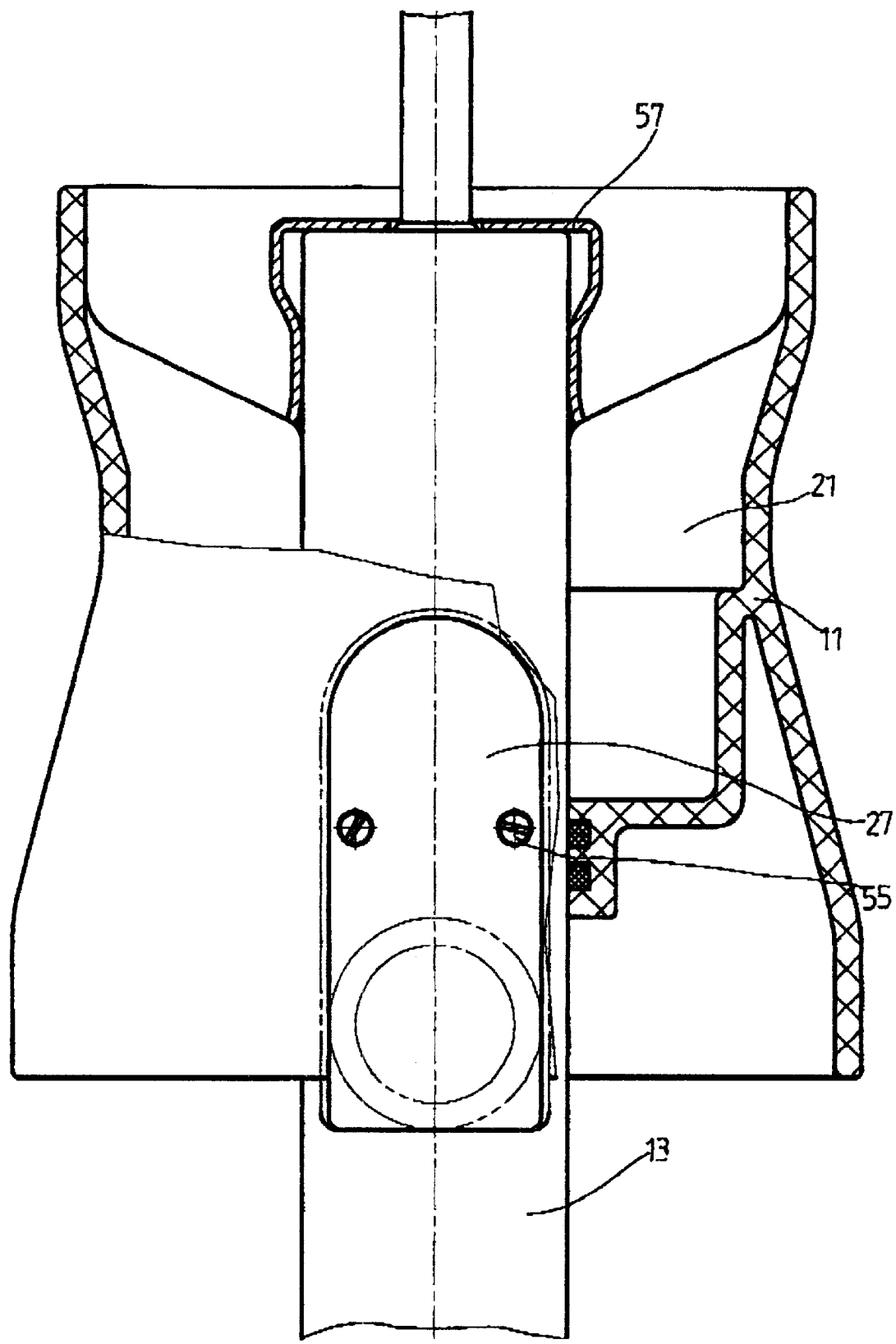
FIG. 8 shows a view of the connecting part shown in FIG. 7.

FIG. 8 shows the connecting part 27, which is shown in section in FIG. 7, in end view. The fastening of the connecting part 27 on the unrolling piston 11 by means of the fastening screws 55 is likewise shown. For further axial fixing of the unrolling piston 11 on the container 13, a retention part 57 is provided which, after the unrolling piston 11 has been pushed on, is fastened on the piston-rod outlet end of the container 13 and acts on the support ribs 21.

Figure 9:
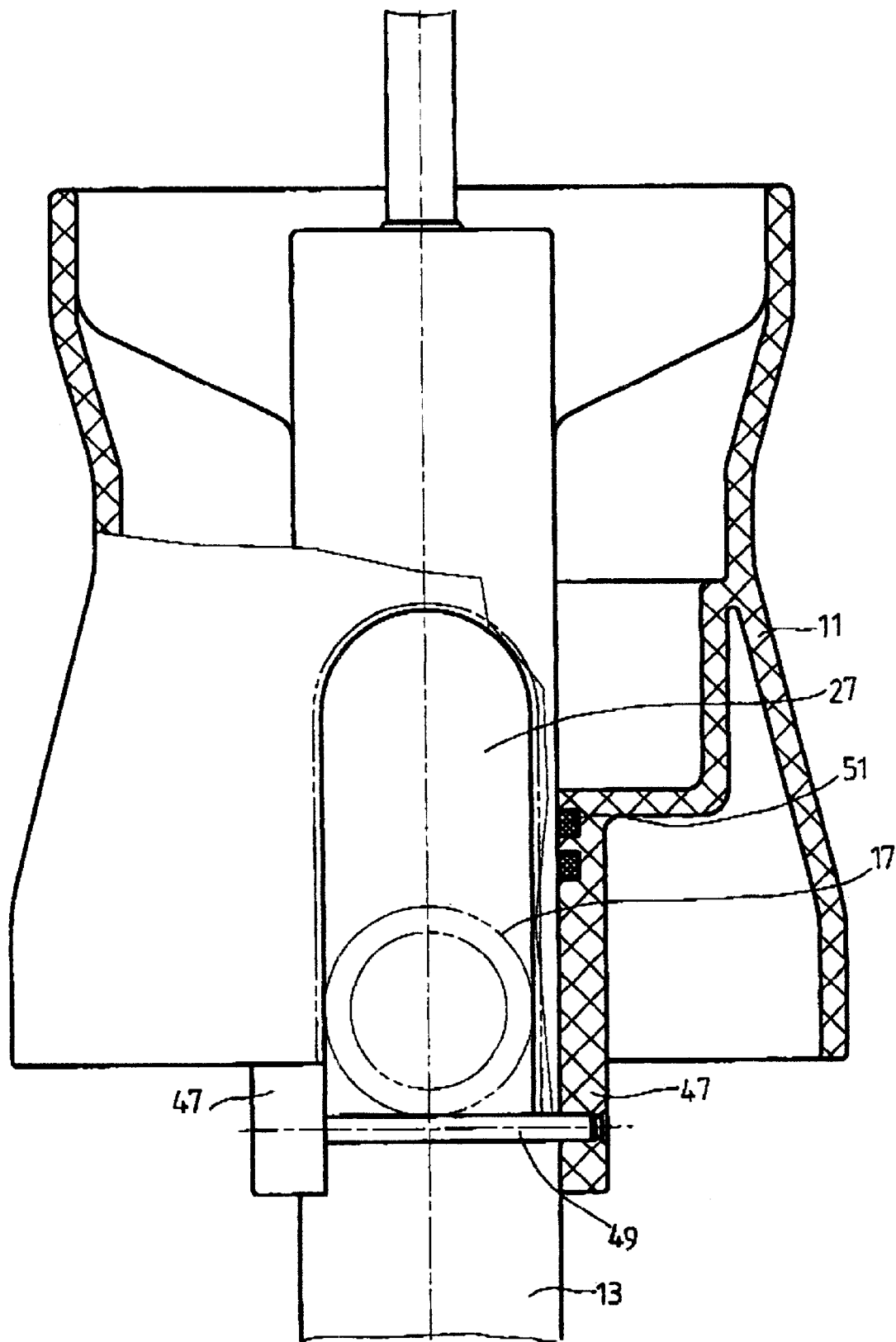
FIG. 9 shows a view of the fixing arrangement for the unrolling piston on the container from FIG. 6 and a connecting part corresponding to FIG. 7.

In a further embodiment shown in FIG. 9, the unrolling piston 11 is provided with two connecting arms 47, which surround the housing 17 and, after the unrolling piston 11 has been pushed onto the container 13. These arms 47 are connected by means of a locking screw or a locking pin 49, which is in contact with the lower edge of the housing, thus creating satisfactory fixing of the unrolling piston 11 on the container 13.

Further embodiments, which have simple, operationally reliable, easily assembled and low-cost connecting parts are, for example, obtained if both the spigot introduced into the connection hole and the connection leading to the damping device are arranged so that they extend at right angles to the center line of the spring strut. By this means, it is possible to ensure that the connecting part can only take place after the assembly of the unrolling piston on the container. The connecting pan can likewise be embodied in one part with the housing cap and be connected to the housing by means of a screw connection.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A spring strut comprising
    an oscillation damper having a container and a damping device which can be modified as a function of pressure,
    an unrolling piston fitted to the container,
    a U-type bellows bounding a spring space, said bellows riding on the unrolling piston and being connected to one of the container and the unrolling piston, and
    a duct which pneumatically connect the spring space and the damping device, said duct being configured without a hose and being integrated into the spring strut, said duct having a section which is formed by the unrolling piston.

2. A spring strut as claimed in claim 1 wherein the unrolling piston comprises support ribs which are received against the container, said section of duct being arranged between two of sad support ribs.

3. A spring strut as claimed in claim 1 wherein the unrolling piston comprises an extension which can be connected to the damping device.

4. A beg strut as claimed in claim 3 wherein said extension comprises a connecting part provided with a ton of the duct.

5. A spring strut as claimed in claim 4 wherein the unrolling piston has a connection hole and the connecting part has a connection mouthpiece which accommodates a seal, said connection mouthpiece engaging said connection hole in sad unrolling piston.

6. A spring strut as claimed in claim 5 wherein said mouthpiece comprises spring tongues which are received in the connection hole, each said spring tongue having a protrusion which engages behind the hole in a snap connection.

7. A spring strut as claim din claim 4 wherein the unrolling piston has an outer contour interrupted by a recess which receives the connecting part and the connecting part has an outer surface which conforms to the outer contour of the unrolling piston.

8. A spring strut as claimed in claim 4 wherein the connecting part comprises a connection having a seal which seals the connection to the damping device.

9. A spring strut as claimed in claim 8 wherein the damping device comprises a housing cap having a hole, the connection being configured as a spigot which forms a plug-in connection with the hole in the housing cap.

10. A spring strut as claimed in claim 9 wherein the spigot and the hole in the housing cap have a common centerline which is parallel to a centerline of the spring strut.

11. A spring strut as claimed in claim 9 wherein the spigot and the hole in the housing cap hare a common centerline which is perpendicular to a centerline of the spring strut.

12. A spring strut as claimed in claim 1 wherein said container comprises a protrusion and said unrolling piston comprises a recess which engages said profusion when said unrolling piston is fitted to said container.

13. A spring strut as claimed in claim 12 wherein said damping device comprises a housing which forms said protrusion.

14. A spring strut as claimed in claim 13 further comprising axial fixing means for axially fixing said unrolling piston on said housing, said axial fixing means comprising said housing of said damping device.

15. A spring strut as claimed in claim 14 further comprising a connecting part arranged between the unrolling piston and the damping device, said connecting part being provided with a connection configured as a spigot extending parallel to a centerline of the spring strut, said housing having a housing cap with a hole which is engaged by said spigot in a snap connection, said connecting part having at least one fastening arm which engages the housing cap in a snap connection.

16. A spring strut as claimed in claim 14 wherein said unrolling piston comprises an axial extension having a recess which accommodates said housing, said axial extension extending underneath said housing, said spring strut further comprising a clamp which fixes said axial extension to said container underneath said housing.

17. A spring strut as claimed in claim 14 wherein said unrolling piston has a arms which encompass the housing and are connected together by a lock screw.

18. A spring strut as claimed in claim 4 wherein the damping device comprises a housing fixed to said container, the connecting part having an integral housing cap which is sealed to the housing.

19. A spring strut as claimed in claim 4 wherein the damping device comprises a housing having a housing cap with an annular recess accommodating a seal, said connecting part having a recess which accommodates the housing cap, said recess having an annular groove which also accommodates said seal.

20. A spring strut as claimed in claim 19 wherein the connecting part is seated on by the unrolling push connection.

* * * * *